Figure 1:
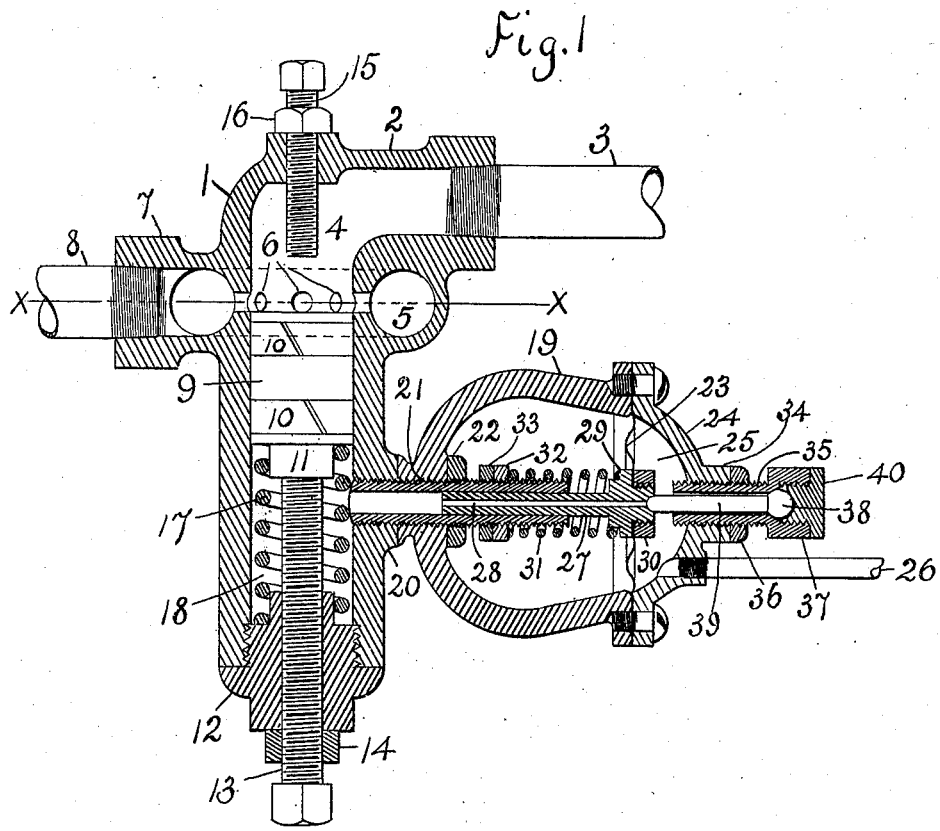

W. K. RANKIN.
STEAM AIR PUMP GOVERNOR.
APPLICATION FILED MAY 12, 1910.

987,080.

Patented Mar. 14, 1911.

Witnesses.
Edward Wilde
J. E. R. Lambert

Inventor.
Wm. K. Rankin
By R. C. Wright
Atty.

UNITED STATES PATENT OFFICE.

WILLIAM K. RANKIN, OF PHILADELPHIA, PENNSYLVANIA, ASSIGNOR TO JOHN E. REYBURN, OF PHILADELPHIA, PENNSYLVANIA.

STEAM AIR-PUMP GOVERNOR.

987,080.      Specification of Letters Patent.      Patented Mar. 14, 1911.

Application filed May 12, 1910. Serial No. 560,827.

*To all whom it may concern:*

Be it known that I, WILLIAM K. RANKIN, a citizen of the United States, residing at Philadelphia, in the county of Philadelphia and State of Pennsylvania, have invented certain new and useful Improvements in Steam Air-Pump Governors, of which the following is a specification.

This invention relates to a governor for an air compressor operated by a steam cylinder, and whereby the admission of the steam to its cylinder is controlled by a reduction of the allowed maximum pressure in the air reservoir, and the steam pressure is cut off when the pressure in the air reservoir reaches the allowed maximum.

The invention is illustrated in the accompanying drawings, wherein similar reference characters indicate similar parts wherever shown and wherein—

Figure 2:
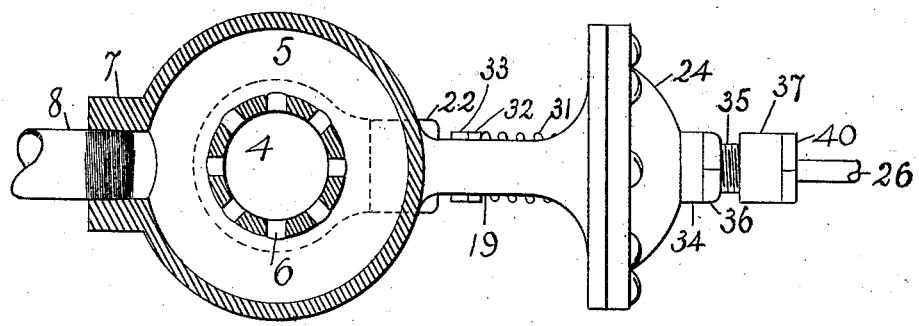

Figure 1 is a vertical central section. Fig. 2 is a horizontal section on line $x$ $x$ Fig. 1.

A steam case 1 is provided with a neck 2 to receive a pipe 3 leading from the source of steam pressure supply (not shown) and the neck is in communication with the interior chamber 4 of the case 1. Surrounding the case 1, on line $x$ $x$ there is a circular channel 5 with ports 6 in communication with chamber 4, and from channel 5 there is a boss 7 with a pipe 8 leading to the steam cylinder (not shown), so that the steam pressure entering pipe 3 and chamber 4 passes through ports 6 to channel 5 and thence to pipe 8. In chamber 4 below ports 6 there is a piston 9 with packing rings 10 and a boss 11. The lower end of case 1 is closed by a screw threaded cap 12 through which passes a regulating screw 13 having a check nut 14, the screw abuts boss 11 and limits the downward position of piston 9, and another screw 15 with a check nut 16 limits the upward movement of piston 9. A spring 17 in piston chamber 18, seated between boss 11 and cap 12 in chamber 18 will act with the air pressure to move piston 9 to close ports 6, and act as a cushion to the piston when the steam pressure actuates the piston to open ports 6. The above comprises the steam devices.

The air pressure means for the control of the steam entering its cylinder, are, a yoke 19 secured to a boss 20 of case 1 by a screw threaded tube 21 entering chamber 18 and having a jam nut 22, the yoke 19 having at its outer end a diaphragm 23 inclosed by a semicircular cover 24 and forming an air chamber 25 into which leads a pipe 26 from an air reservoir (not shown). A stem 27 having a passage 28 therethrough to the interior of tube 21 from chamber 25 has a free fit in tube 21 and its head 29 is secured to diaphragm 23 by a nut 30. A spring 31 is seated between head 29 and nut 32 and jam nut 33 and is the means to regulate the diaphragm to an accumulation of a desired maximum pressure in the air reservoir, above which the diaphragm will move to admit air to chamber 18 under piston 9 to close ports 6. Passing through boss 34 of cover 24 there is a screw threaded spindle valve sleeve 35, having a jam nut 36, a hollow screw threaded head 37 inclosing the head 38 of spindle valve 39 by a screw plug 40. As the pressure in the air reservoir increases above its maximum allowance it depresses diaphragm 23, carrying down stem 27 and opening passage 28 to admit air pressure through tube 21 to chamber 18, under piston 9, forcing it up to close ports 6 and cutting off the steam supply to the steam cylinder, assisted by spring 17. As the pressure in the chamber 25 decreases the diaphragm 23 will assume its non-expansive or normal position, spindle valve 39 will close passage 28, the free fit of stem 27 in tube 21 will allow the air pressure in chamber 18 to escape, and piston 9 will be gradually forced down on spring 17 by the steam pressure in chamber 4 to uncover ports 6, and the steam cylinder will become operative in working the air pump.

I claim.

1. In a steam air-compressor governor, a chamber having a steam pressure entrance, a surrounding channel in communication with the chamber, a steam pressure outlet from the channel, a piston chamber and a piston therein, adjustable means to limit the piston's movements, resilient means to force the piston to close the steam pressure entrance, and cushion its return movement; an air pressure entrance to the piston chamber, a spindle valve adapted to close said entrance, and a diaphragm operative by air pressure to move away from the spindle valve and open the air pressure entrance to the piston chamber.

2. In a steam air-compressor governor, a steam chamber, a surrounding channel having ports in communication therewith, a steam passage to the chamber and therethrough by the ports to the channel and outward from the channel; a piston in the chamber actuated by spring and air pressure to close the ports to the channel, and with adjustable means to limit its movement in both directions; a diaphragm, a chamber for the diaphragm in communication with an air reservoir, and a passage therefrom to the piston chamber, and under the piston; means to adjust the diaphragm for movement at a predetermined pressure in the air reservoir, and a valve adapted to open the passage to the piston chamber upon the movement of the diaphragm.

In testimony whereof I affix my signature in presence of two witnesses.

WILLIAM K. RANKIN.

Witnesses:
CHARLES E. WILLIAMS,
R. C. WRIGHT.

---

Copies of this patent may be obtained for five cents each, by addressing the "Commissioner of Patents, Washington, D. C."